INVENTOR
ROY E. LORENTZ JR.
BY *Robert L Olson*
ATTORNEY

United States Patent Office 3,467,809
Patented Sept. 16, 1969

3,467,809
WELDING APPARATUS FOR FORMING PANELS OF TUBES
Roy E. Lorentz, Jr., Chattanooga, Tenn., assignor to Combustion Engineering, Inc., Windsor, Conn., a corporation of Delaware
Filed Nov. 18, 1966, Ser. No. 595,446
Int. Cl. B23k 9/12
U.S. Cl. 219—124    4 Claims

ABSTRACT OF THE DISCLOSURE

Apparatus for joining together two parallel tubular members by a web, including two electrodes positioned side by side which deposit molten metal to form separate fins on each of the tubular members, and a third electrode positioned longitudinally from the other two electrodes which deposits molten metal for joining the already-formed fins, thereby forming a continuous web between the two tubular members.

---

This invention relates to welding apparatus for welding together parallel members, and in particular metallic tubes, so as to form panels thereof.

A recent trend in the boiler industry is to line the walls of the furnace with boiler tubes which are welded together into integral panels. One previous method of welding tubes together, as explained in more detail in U.S. application Ser. No. 483,075, filed on Aug. 27, 1965, utilizes stationary welding equipment, with the tubes to be welded together moved therepast. A consumable electrode deposits molten metal between the tubes, which when solidified, forms a metal web between the tubes. While this method is quite successful, it does have some shortcomings. Because of the the large amount of molten metal that has to be deposited to form a continuous web between the tubes, there are limitations on minimum tube wall thickness that can be welded together. Also the maximum web width is limited. Difficulty is also encountered in properly dissipating the large amount of welding heat created during the welding process.

It is an object of my invention to provide a stationary welding apparatus whereby tubes to be welded together are moved past it, without encountering the above mentioned difficulties. By utilizing a plurality of properly spaced consumable electrodes, webs of greater width, and tubes of thinner wall thickness, can be successfully welded than heretofore possible. The procedure also allows closer control of dimensions than heretofore possible. My invention also allows cooling by passing water through the tubes being welded, which dissipates the welding heat at a far greater rate than has been accomplished in the past.

Other and further objects will become apparent from the following description when considered in combination with the accompanying drawings wherein.

Figure 1:
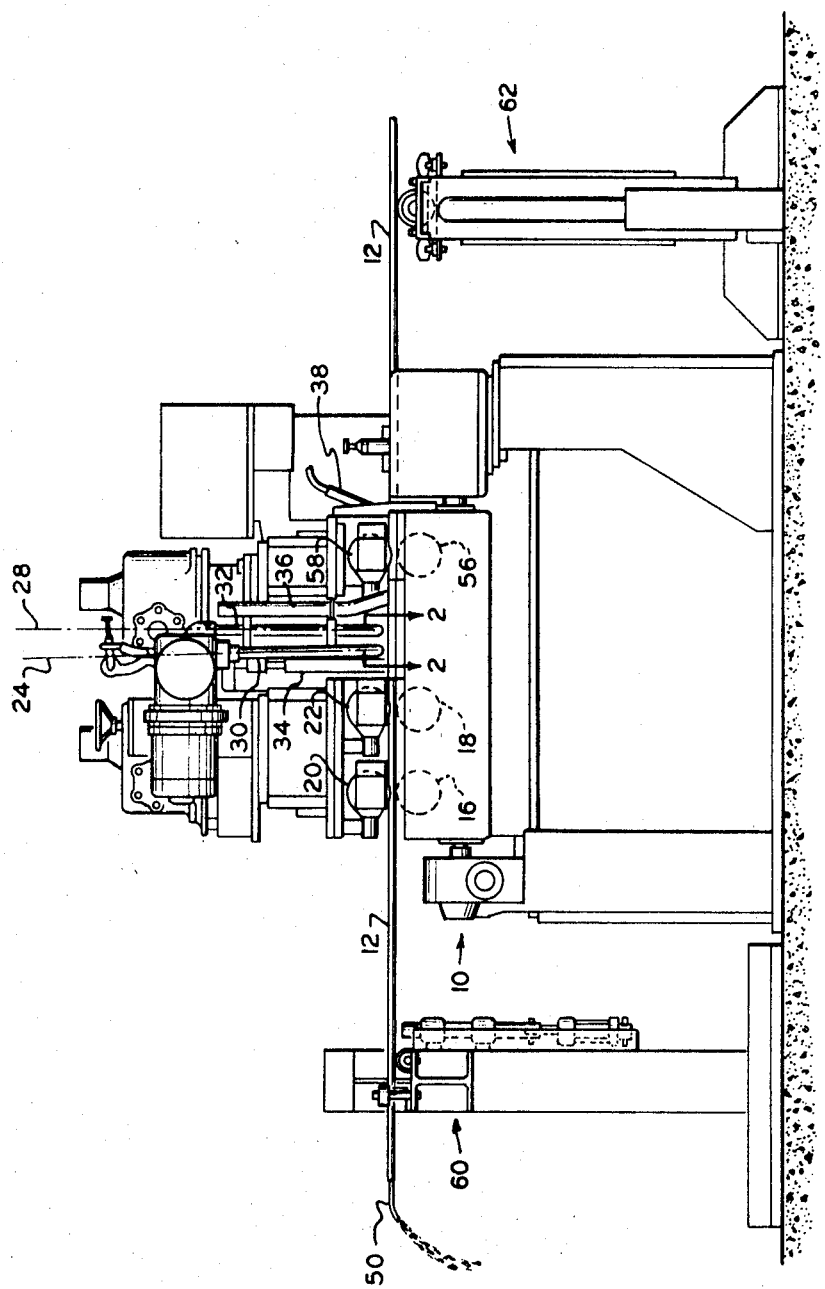
FIGURE 1 is a front view of a tube welder embodying the invention.
Figure 2:
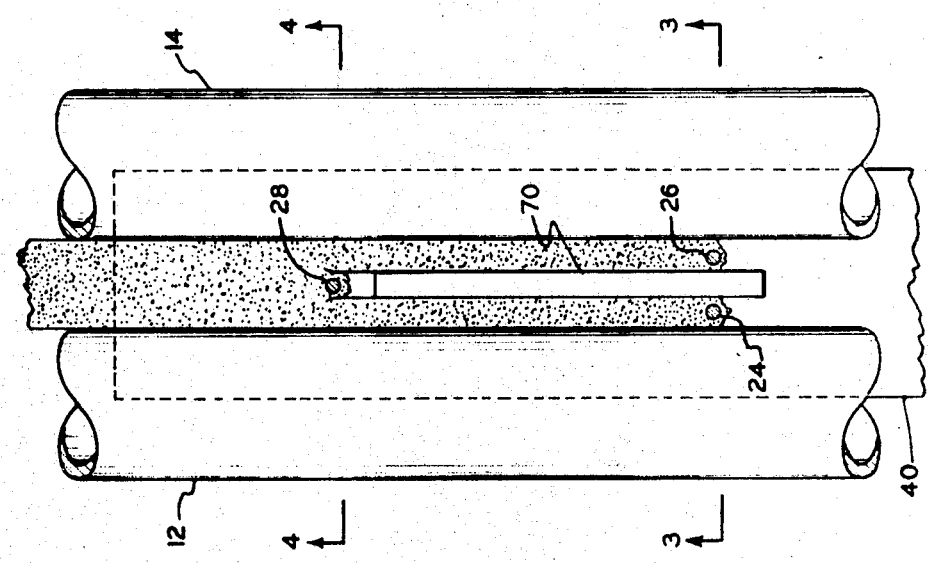
FIGURE 2 is an enlarged view taken along lines 2—2 of FIGURE 1.

Looking now to FIGURES 1 and 2, 10 denotes a welding machine in its entirety. Numerals 12 and 14 indicate two parallel, spaced steel tubes to be welded together. The tubes are fed into the welding machine by means of pairs of entrance drive rollers 16 and 18, which can be suitably gear or chain driven by means of a motor (not shown). The tubes are held in engagement with the drive rollers by means of pairs of upper entrance guide rollers 20 and 22. These rolls also determine the final tube spacing and alignment.

Consumable electrode wires 24, 26 and 28 are positioned above and intermediate the two tubes 12 and 14. These electrode wires are fed through suitable electrode wire guides, two of which are shown in FIGURE 1 as 30 and 32. The electrode wires, the tubes 12 and 14, and the copper back-up means 40 (FIGURES 3 and 4) positioned beneath the tubes, are electrically connected such that an arc is established. The source of current can be either AC or DC as desired. In order to shield the weld to prevent oxidation thereof, a flux dispensing means 34 directs protective material around the weld area. Suitable flux recovery means 36 picks up any excess flux. Air chisel 38 clears or removes the slag from the weld.

A back-up shoe 40 is positioned beneath the welding heads, and the upper surface thereof extends between the two parallel tubes. The back-up shoe is made of copper, or other suitable material, and acts as a back-up, or chill bar, for the molten metal. The element will be described in greater detail later.

Looking again to FIGURE 1, a pair of exit drive rollers 56 are positioned on the outlet side of the welding heads. Upper rollers 58 press the tubes into engagement with the lower drive rolls 56. The linear speed of the outer periphery of the drive rolls 16, 18 and 56 should all be the same. This can be accomplished by driving these rollers from the same motor, or by means of synchronized motors. A plurality of feed in racks 60 support the tubes on the entrance end of the welding machine. Likewise, a plurality of feed out racks 62 support the tubes at the outlet end.

Figure 4:
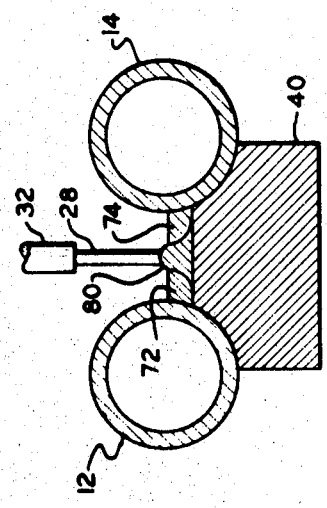
FIGURE 4 is a sectional view taken along lines 4—4 of FIGURE 2.
Figure 3:
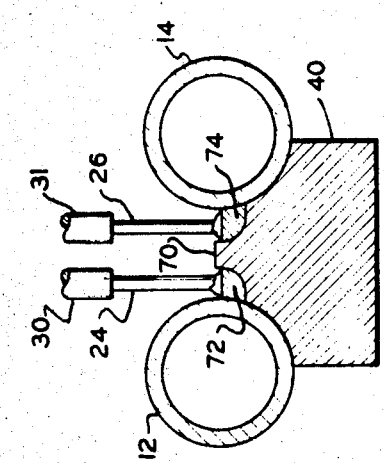
FIGURE 3 is a sectional view taken along lines 3—3 of FIGURE 2.

Referring to FIGURES 2, 3 and 4, the manner in which the molten metal forming the joining web will now be described. As the tubes 12 and 14 enter the stationary welding machine, they first pass under adjacent consumable electrodes 24 and 26. The electrodes 24 and 26 are positioned adjacent to and between the tubes 12 and 14. Electrode 24 forms a continuous puddle of molten metal which fuses to tube 12, and electrode 26 deposits a continuous puddle of molten metal which fuses to tube 14. When this molten metal solidifies, separate ears or fins 72 and 74 (FIGURE 3) are formed on the two tubes.

The copper back-up shoe 40, which supports and helps chill the molten metal, has a rib 70 (FIGURES 2 and 3). Rib 70, together with the two tubes 12 and 14, form a pair of troughs into which the molten metal forming ears 72 and 74 is deposited. The length of rib 70 is such that the molten metal forming fins 72 and 74 solidifies sufficiently that they can hold their own shape as they move past the end of rib or protrusion 70.

Immediately adjacent the end of rib 70 a third consumable electrode 28 is positioned (FIGURES 2 and 4). This consumable electrode deposits molten metal 80 intermediate the ears 72 and 74, thus forming a metal web which completely bridges the gap between tubes 12 and 14. The length of back-up shoe 40, measured from electrode 28 to its rear edge, is such that the molten metal 80 solidifies sufficiently so that it can hold its shape after moving past the end of shoe 40.

In order to rapidly dissipate the welding heat from ears 72 and 74, cooling water can be passed through tubes 12 and 14 by means of hose 50 (FIGURE 1). This type of cooling has not previously been possible because of the large mass of molten metal which has been deposited in one location. Passing water through the tubes being welded together would cause rapid cooling of the molten metal directly adjacent the tubes, with a much slower rate of cooling in the center. Thus thermal stresses would be set up, which could cause defects in the finished product. Since only ⅓ or ¼ of the total molten mass is deposited adjacent either of tubes 12 or 14 individually, the thermal stress is reduced considerably.

From the above described welding operation a number of advantages result. It is possible to form panels with wider webs, and also to weld tubes of thinner wall thickness. Better welding quality with complete bonding of the web metal to the tube walls is possible, while substantially eliminating the possibility of burnthrough of the tube walls by the molten metal.

Although specific apparatus has been described in connection with the formation of water wall panels which are composed of integrally welded thin walled tubes which are used in modern high capacity steam generators, it is to be understood that the welding machine has utility in refinements other than that herein employed to illustrate and explain the same. I therefore do not wish to be limited in the scope of my invention except as may be required by the claims.

What I claim is:

1. Apparatus for welding together first and second parallel, spaced metallic members continuously along their adjacent longitudinal portions comprising, first and second consumable electrodes positioned in the space between the first and second metallic members in side-by-side relationship, the first consumable electrode being positioned close to the first metallic member such that when the molten metal being deposited solidifies it forms a first fin united to said first metallic member, the second consumable electrode being positioned close to the second metallic member such that when the molten metal being deposited solidifies it forms a second fin united to said second metallic member, a third consumable electrode positioned centrally of the first and second consumable electrodes and spaced longitudinally downstream therefrom, such that the molten metal being deposited solidifies to join the first and second fins, rib means positioned midway between the first and second metallic members and extending longitudinally downstream, having one end adjacent the first and second consumable electrodes and another end adjacent the third consumable electrode, said rib means being of sufficient height to prevent the molten metal from the first consumable electrode from commingling with the molten metal from the second consumable electrode, and means for causing relative movement between the first and second metallic members, and the first, second and third consumable electrodes and the rib means, thus forming a continuous, imperforate web between the first and second metallic members during one welding pass.

2. Apparatus for welding together first and second parallel, spaced metallic members continuously along their adjacent longitudinal portions comprising, first and second consumable electrodes positioned in the space between the first and second metallic members in side-by-side relationship, the first consumable electrode being positioned close to the first metallic member such that when the molten metal being deposited solidifies it forms a first fin united to said first metallic member, the second consumable electrode positioned close to the second metallic member such that when the molten metal being deposited solidifies it forms a second fin united to said second metallic member, a third consumable electrode positioned centrally of the first and second consumable electrodes and spaced longitudinally downstream therefrom, such that the molten metal being deposited solidifies to join the first and second fins, driver means for moving the first and second metallic members longitudinally past the first, second and third consumable electrodes, a chill bar positioned between the first and second metallic members beneath the first, second and third consumable electrodes for supporting the molten metal until it solidifies, said chill bar having a raised portion on its upper surface which runs longitudinally from a point adjacent the first an second consumable electrodes to a point upstream of the third consumable electrode, such raised portion preventing molten metal from the first and second consumable electrodes from running together.

3. The combination set forth in claim 2, wherein the first and second metallic members are tubular members.

4. The combination set forth in claim 3, including a source of cooling water, and one end of each of the tubular members is connected to the source of cooling water, so that the tubular members can be water cooled during the welding process.

References Cited

UNITED STATES PATENTS

| | | | |
|---|---|---|---|
| 2,436,387 | 2/1948 | Harter et al. | 219—137 |
| 1,502,489 | 7/1924 | Steenstrup | 219—124 |
| 2,478,985 | 8/1949 | Steward et al. | 219—137 |
| 1,980,561 | 11/1934 | Wagner | 219—137 |

L. A. SCHUTZMAN, Assistant Examiner

JOSEPH V. TRUHE, Primary Examiner